United States Patent
Dettinger et al.

(10) Patent No.: US 7,873,631 B2
(45) Date of Patent: *Jan. 18, 2011

(54) ABSTRACTLY MAPPED PHYSICAL DATA FIELDS

(75) Inventors: Richard D. Dettinger, Rochester, MN (US); Daniel P. Kolz, Rochester, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 416 days.

This patent is subject to a terminal disclaimer.

(21) Appl. No.: 12/124,546

(22) Filed: May 21, 2008

(65) Prior Publication Data

US 2008/0222124 A1    Sep. 11, 2008

Related U.S. Application Data

(63) Continuation of application No. 11/216,384, filed on Aug. 31, 2005, now Pat. No. 7,403,937.

(51) Int. Cl.
*G06F 7/00* (2006.01)
*G06F 17/30* (2006.01)
*G06F 15/16* (2006.01)

(52) U.S. Cl. .................. 707/716; 707/772; 707/804

(58) Field of Classification Search ........... 707/716, 707/772, 804
See application file for complete search history.

(56) References Cited

U.S. PATENT DOCUMENTS

| | | |
|---|---|---|
| 5,734,887 A | 3/1998 | Kingberg et al. |
| 6,553,366 B1 | 4/2003 | Miller et al. |
| 6,553,368 B2 | 4/2003 | Martin et al. |
| 6,725,227 B1 | 4/2004 | Li |
| 6,892,204 B2 | 5/2005 | Haas et al. |
| 6,928,431 B2 | 8/2005 | Dettinger et al. |
| 6,954,748 B2 | 10/2005 | Dettinger et al. |
| 6,996,558 B2 | 2/2006 | Dettinger et al. |
| 7,096,229 B2 | 8/2006 | Dettinger et al. |
| 7,139,774 B2 | 11/2006 | Dettinger et al. |
| 7,146,376 B2 | 12/2006 | Dettinger et al. |
| 7,185,317 B2 | 2/2007 | Fish et al. |
| 7,403,937 B2 | 7/2008 | Dettinger et al. |
| 2002/0078068 A1 | 6/2002 | Krishnaprasad et al. |
| 2005/0097099 A1 | 5/2005 | Kapoor et al. |

*Primary Examiner*—Greta L Robinson
*Assistant Examiner*—Brian E Weinrich
(74) *Attorney, Agent, or Firm*—Patterson & Sheridan, LLP

(57) ABSTRACT

A method, apparatus, and article of manufacture for managing access to an abstract database are provided. The abstract database may include a data abstraction model comprising a plurality of logical field definitions, each of the definitions comprising a logical field name, and an access method maps the logical field to a physical data field. Collectively, the physical data fields provide an indirection layer logically disposed between the data abstraction model and the underlying physical database. By providing this layer of indirection using the physical data fields, a number of enhancements to the data abstraction model may be provided. This includes providing enhancements to the security, administration, and usability of an abstract database.

10 Claims, 9 Drawing Sheets

ABSTRACTLY MAPPED PHYSICAL DATA FIELDS

CROSS-REFERENCE TO RELATED APPLICATIONS

This application is a continuation of U.S. patent application Ser. No. 11/216,384, filed Aug. 31, 2005 now U.S. Pat. No. 7,403,937, which is herein incorporated by reference in its entirety.

BACKGROUND OF THE INVENTION

1. Field of the Invention

The present invention generally relates to database query processing and, more particularly, methods and techniques for representing data stored in an underlying physical database.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Databases are often large, complex software applications that require specialized training to use or administer properly. Because of this complexity, database abstraction techniques have been developed that provide an abstraction layer between an underlying physical representation of data (used by the physical database) and an abstraction layer presented to users interacting with the database. For example, commonly assigned U.S. patent application Ser. No. 10/083,075 (the '075 application) entitled "Application Portability and Extensibility through Database Schema and Query Abstraction," discloses techniques for constructing a data abstraction model over an underlying physical database. The '075 application discloses a data abstraction model constructed using logical fields that map to data stored in the underlying physical database. The definition for each logical field includes an access method specifying a location (i.e., a table and column) in the underlying database from which to retrieve data. Users compose an abstract query by selecting logical fields and specifying conditions.

A database administrator will often wish to control the access granted to users of the database based on physical parameters like tables and columns. This is especially the case when significant effort has already been made in creating a security model for the underlying physical database. Consider, for example, a relational database table used to store test results for medical tests. Given concerns about the privacy of patient medical records, a database administrator is likely to restrict access to data in this table. It would be ideal to reuse the security model for the physical database as a basis for implementing a security model for the data abstraction model. However, no mechanisms are currently available that allow an administrator to easily control access to the logical fields provided by the data abstraction model using these types of underlying physical parameters.

One approach includes exposing a subset of the logical fields created for a data abstraction model. Such a view may include instructions that remove or redefine logical fields in the data abstraction model. With these instructions, any field in the data abstraction model may be removed. In addition, any fields, which depend upon the removed field, will also be removed. Although this strategy works well, it does not remove logical fields from the data abstraction model based on the location from which a particular logical field draws information. For example, if an administrator wanted to remove all logical fields that referenced a specific table, the administrator would have to evaluate the data abstraction model, field by field, to evaluate each data access method. When a logical field was found with a data access method referencing the specific table, the administrator could then remove it from data abstraction model. For a data abstraction model with a substantial number of logical fields, or with multiple data abstraction models, each exposing a different "version" of the underlying physical database, this process may become time consuming and prone to error.

Accordingly, there remains a need for techniques to manage access to data represented using a data abstraction model.

SUMMARY OF THE INVENTION

The present invention generally provides techniques for physical data field substitution in an abstract database. Physical data field substitution is a method that allows physical data (e.g., columns from tables in a relational database) to be treated in the same way as logical data (e.g., a collection of logical fields in an abstract database, as described below). In one embodiment, this allows physical data to be hidden from the users of the database, and allows the representation of data to be redefined in the same way for any logical fields that access the physical field. Thus, physical data field substitution offers a single, flexible representation of the underlying physical database, without adding an unreasonable level of administrative complexity for the database administrator.

For example, once completed, the data abstraction model need not interact with the physical database directly. Instead, the physical data field layer provides a level of indirection between the database abstraction model and the physical database. The physical data field layer provides a common namespace for the abstract entities (exposed to a user as a collection of logical fields) and physical entities (database columns exposed to the logical fields as physical data fields). Thus, the logical fields provide data based on what is exposed from the underlying database by the physical data fields. Exposing data using a collection of physical data fields allows a number of enhancements to the abstract query environment (e.g., security and access controls, or presentation and data format enhancements).

One embodiment provides a computer-implemented method of providing access to physical data in a physical database. The method generally includes providing a physical data field layer that includes a plurality of physical data fields, wherein each physical data field specifies a mapping from the physical data field to a data location in the physical database, and providing a logical field layer that includes a plurality of logical field definitions, each of the definitions comprising a logical field name and a reference to an access method that defines a manner of exposing specified data corresponding to the logical field definition.

Another embodiment of the invention provides a computer-readable medium containing a program, which when executed on a computer system performs an operation for providing access to physical data in a physical database. The operations generally include providing a physical data field layer that provides a plurality of physical data fields, wherein each physical data field specifies a mapping from the physical data field to a data location in the physical database, and providing a logical field layer that includes a plurality of logical field definitions, each of the definitions comprising a logical field name and a reference to an access method that defines a manner of exposing specified data.

Another embodiment provides a system for providing access to a physical database. The system generally includes a logical field layer comprising a plurality of logical field definitions wherein each of the definitions includes a logical field name and at least one an access method selected from at least two different access method types, and wherein each of the different access methods types defines a different manner of exposing specified data retrieved from a physical data field. The system generally further includes physical data field layer logically disposed between the logical field layer and the physical database. The physical data field layer provides a plurality of physical data fields wherein each physical data field specifies a mapping from the physical data field to a data location in the physical database. The system still generally further includes a query specification that defines an interface to the plurality of logical field definitions, wherein the interface presents a user with an interface for composing an abstract query corresponding to the logical field definition.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments illustrated by the appended drawings. These drawings, however, illustrate only typical embodiments of the invention and are not limiting of its scope, for the invention may admit to other equally effective embodiments.

DETAILED DESCRIPTION OF THE PREFERRED EMBODIMENTS

Figure 1:
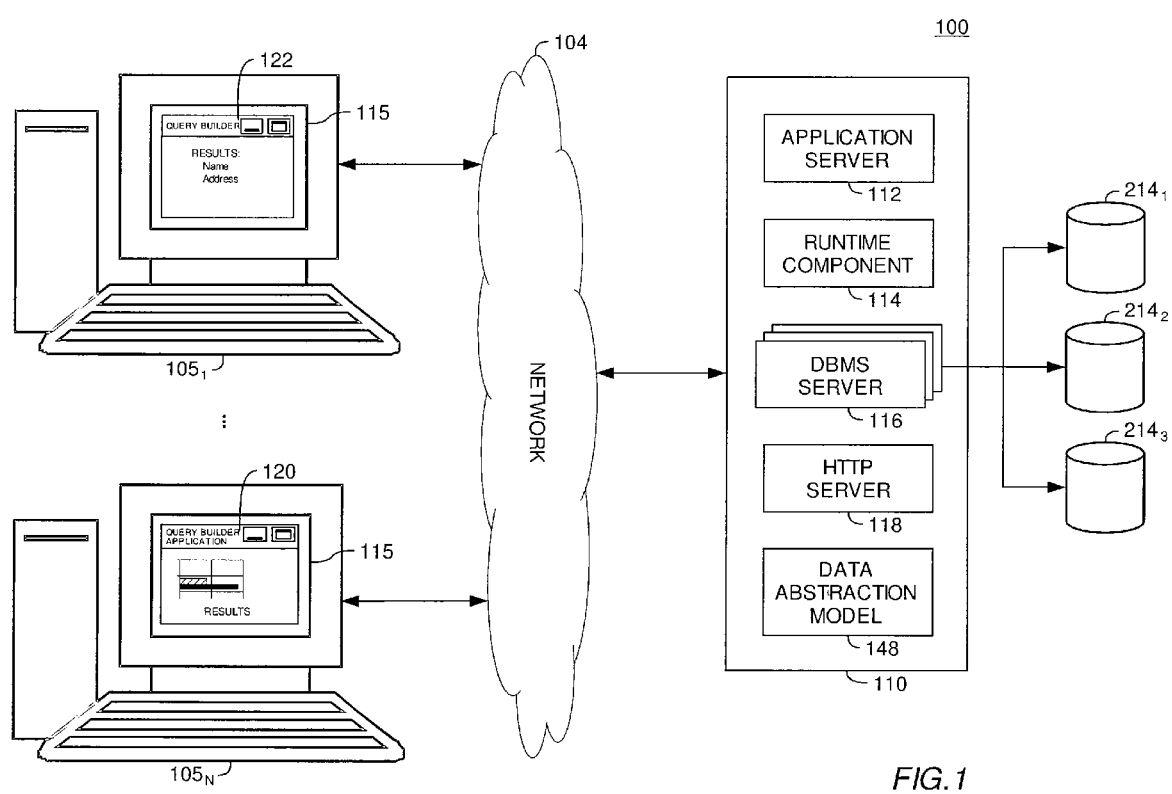
FIG. 1 illustrates an exemplary computing and data communications environment, according to one embodiment of the invention.

Embodiments of the present invention include a method, system, and article of manufacture that provide a layer of indirection between a data abstraction model and an underlying physical database. In one embodiment, the logical fields of a data abstraction model may be configured with access methods that map to intermediary physical data fields, which, in turn, map directly to the underlying physical database. The physical data fields may be created dynamically as a data abstraction model is loaded into memory. Accordingly, during runtime, the access methods for the logical fields are redefined to map to an equivalent set of physical data fields using the physical data field substitution techniques described below. Thus, the logical fields provide query response data based on what is exposed from the underlying database by the physical data fields. By providing this layer of indirection using the physical data fields, a number of enhancements to the data abstraction model may be provided. This includes, without limitation, providing enhancements to the security, administration, and usability of an abstract database. Furthermore, database administration may be greatly simplified as changes to a physical data field will impact the data abstraction model automatically.

The following description references embodiments of the invention. The invention, however, is not limited to any specifically described embodiment; rather, any combination of the following features and elements, whether related to a described embodiment or not, implements and practices the invention. Moreover, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, references to "the invention" should neither be construed as a generalization of any inventive subject matter disclosed herein nor considered an element or limitation of the appended claims; except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of computer-readable media. Illustrative computer-readable media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such computer-readable media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, application programs are described herein using discrete modules or components interacting with one another. Those skilled in the art recognize, however, that different embodiments may combine or merge such components and modules in many different ways.

Moreover, examples described herein reference medical research environments. These examples are provided to illustrate embodiments of the invention, as applied to one type of data environment. The techniques of the invention, however, are contemplated for any data environment including, for example, transactional environments, financial environments, research environments, accounting environments, legal environments, and the like.

The following material first describes a typical embodiment of the data abstraction model. A layer of physical data fields is then described as an enhancement to the data abstraction model. The additional layer of indirection provided by the physical data fields is disposed between the data abstraction model and underlying physical database. Those skilled in the art will recognize, however, that the techniques described herein for physical data field substitution and for query processing may be extended or applied to many database environments, including a relational database system, and other data storage models, whether currently known or later developed.

The Data Abstraction Model: Physical View of the Environment

FIG. 1 illustrates a networked computer system using a client-server configuration. Each client computer system $105_{1-N}$ includes a network interface that enables communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on client system 105, (e.g., a Linux® distribution, Microsoft Windows®, IBM's AIX® or OS/400®, FreeBSD, and the like). ("Linux" is a registered trademark of Linus Torvalds in the United States and other countries.)

The server system 110 may include hardware components similar to those used by client system 105. Accordingly, the server system 110 generally includes a CPU, a memory, and a storage device, coupled by a bus (not shown). Like each client 105, server system 110 is also running an operating system.

The client-server configuration illustrated in FIG. 1, however, is merely exemplary of one hardware and software configuration. Embodiments of the present invention may be implemented using other configurations, regardless of whether the computer systems are complex multi-user computing systems, such as a cluster of individual computers connected by a high-speed network, single-user workstations, or network appliances lacking non-volatile storage. Additionally, although FIG. 1 illustrates computer systems using client and server architecture, embodiments of the invention may be implemented in a single computer system, or in other configurations, including peer-to-peer, distributed, or grid architectures.

In one embodiment, users interact with the server system 110 using a graphical user interface (GUI) provided by query building interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and the application 120 may be configured to allow a user to compose an abstract query, and to submit the query to the runtime component 114.

As illustrated in FIG. 1, server system 110 may further include runtime component 114, DBMS server 116, and data abstraction model 148. In one embodiment, these components may be provided as software applications executing on the server system 110. DBMS server 116 includes a software application configured to manage databases $214_{1-3}$. That is, the DBMS server 116 communicates with the underlying physical database system, and manages the physical database environment behind the data abstraction model 148. In one embodiment, users interact with the query interface 115 to compose and submit an abstract query to the runtime component 114 for processing. In turn, the runtime component 114 receives an abstract query and, in response, generates a query of underlying physical databases 214.

In one embodiment, the runtime component may be configured to generate a query (e.g., an SQL statement) from an abstract query. Typically, users compose an abstract query from the logical fields defined by the data abstraction model 148, and the runtime component 114 may be configured to use the access method defined for a logical field 208 when generating a query of the underlying physical database (which may be referred to as a "resolved", "executable" or "physical" query) from an abstract query. Logical fields, access methods, and physical data field substitution are described in greater detail below. Additionally, the runtime component 114 may also be configured to return query results to the requesting entity, (e.g., using HTTP server 118, or equivalent).

The Data Abstraction Model: Logical View of the Environment

Figure 2A:
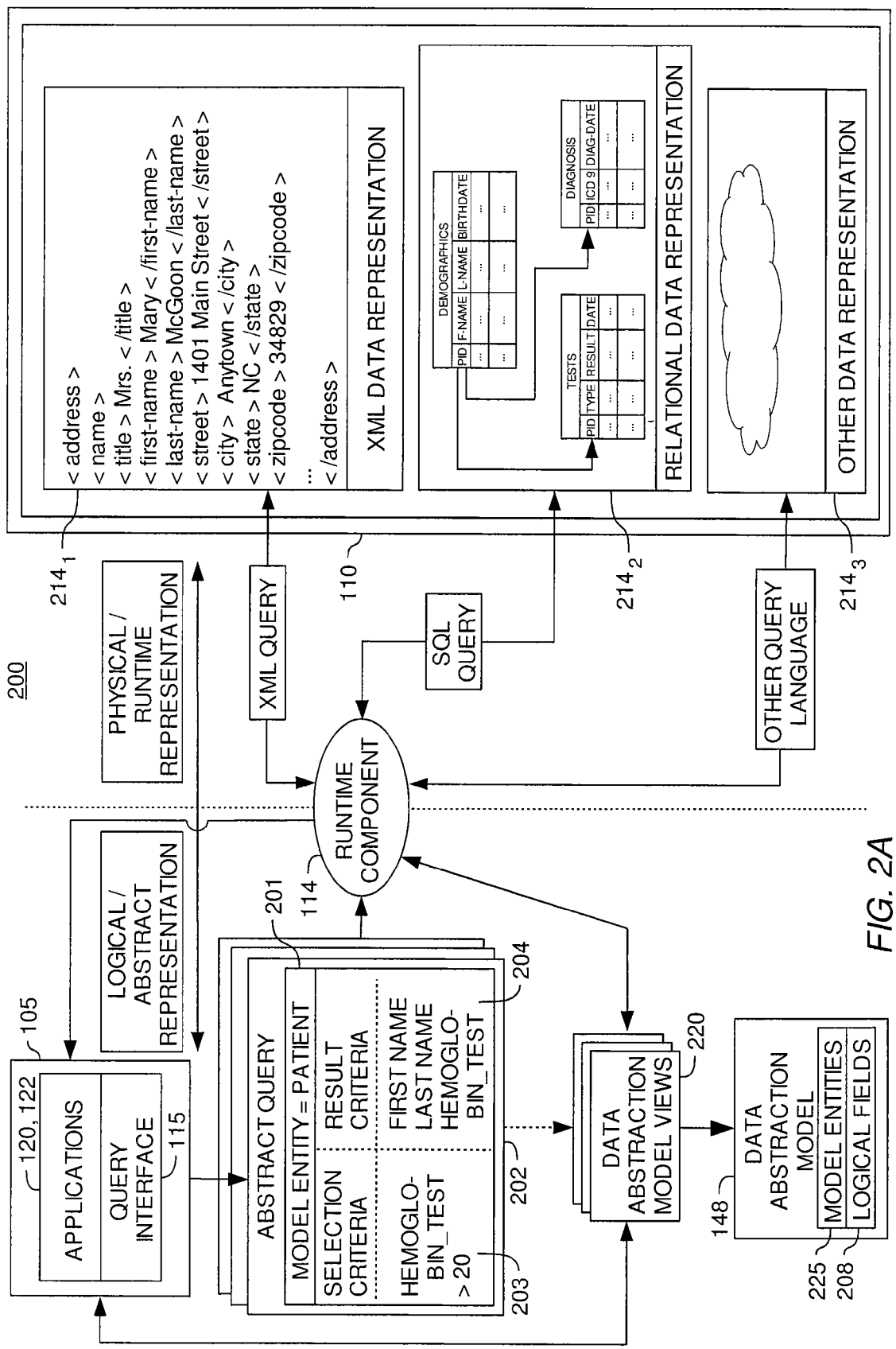
FIG. 2A illustrates a logical view of the data abstraction model configured to access data stored in an underlying physical database, according to one embodiment of the invention.

FIG. 2A is a functional block diagram illustrating interrelated components of the invention, and also illustrates the relationship between the logical view of data provided by the data abstraction model components (the left side of FIG. 2A), and the underlying physical database components (the right side of FIG. 2A).

In one embodiment, the data abstraction model 148 provides definitions for a set of logical fields 208 and model entities 225. Users compose an abstract query 202 by specifying logical fields 208 to include in selection criteria 203 and results criteria 204. An abstract query 202 may also identify a model entity 201 from the set of model entities 225. The resulting query is generally referred to herein as an "abstract query" because it is composed using logical fields 208 rather than direct references to data structures in the underlying physical databases 214. The model entity 225 may be used to indicate the focus of the abstract query 202 (e.g., a "patient", a "person", an "employee", a "test", a "facility" etc).

For example, abstract query 202 includes an indication that the query is directed to instances of the "patient" model entity 201, and further includes selection criteria 203 that includes the conditions "hemoglobin_test>40." The selection criteria 203 are composed by specifying a condition evaluated against the data values corresponding to a logical field 208 (in this case the "hemoglobin_test" logical field). The operators in a condition typically include comparison operators such as =, >, <, >=, or, <=, and logical operators such as AND, OR, and NOT. Results criteria 204 indicates that the data retrieved for instances of the model entity that satisfy the selection criteria 203 should include data from the "name," "age," and "hemoglobin_test" logical fields 208.

The definition for each logical field 208 specifies an access method for accessing data at a particular location in the underlying physical database 214. The particular location may be specified in the logical field definition as, for example, a table name and a column name. In other words, the access method (and corresponding location information) defined for a logical field provides a mapping between the logical view of data exposed to a user interacting with the interface 115 and the physical view of data used by the runtime component 114 to retrieve data from the physical databases 214. In a particular embodiment, the access method describes how the data at the specified location is to be exposed. Accordingly, a variety of different access method types are contemplated, as will be described below. For brevity, reference to an "access method" may refer to the specification of a particular type of access method in a logical field definition, as well as the corresponding location information.

In one embodiment, which logical fields 208 are available to use in query operations may be determined by one of the data abstraction model views 220. The abstraction model views 220 provide an access control mechanism for the underlying logical fields 208. In one embodiment, each data abstraction model view 220 includes a set of instructions to remove or redefine fields in the abstraction model 148 for a particular user, or group of users. With these instructions, any field in the abstraction model can be removed or redefined. Further, this may occur in a cascading fashion, e.g., where a logical field that depends upon a removed field will itself be removed from the view exposed by a particular data abstraction model view 220.

Additionally, the data abstraction model 148 may define a set of model entities 225 that may be used as the focus, or central concept, for an abstract query 202. In one embodiment, users select which model entity to query as part of the query composition process. Model entities are descried below, and further described in commonly assigned, co-pending application Ser. No. 10/403,356, filed Mar. 31, 2003, entitled "Dealing with Composite Data through Data Model Entities," incorporated herein by reference in its entirety.

In one embodiment, the runtime component 114 retrieves data from the physical database 214 by generating a resolved query (e.g., an SQL statement) from the abstract query 202. Depending on the access method specified for a logical field, the runtime component 114 may transform abstract query 202 into an XML query that queries data from database $214_1$, an SQL query of relational database $214_2$, or other query composed according to another physical storage mechanism using other data representation $214_3$, or combinations thereof (whether currently known or later developed).

An illustrative abstract query, corresponding to abstract query 202, is shown in Table I below. In this example, the abstract query 202 is represented using eXtensible Markup Language (XML). In one embodiment, query building interface 115 may be configured to generate an XML document to represent an abstract query composed by a user. Those skilled in the art will recognize that XML is a well known markup language used to facilitate the sharing of structured text and information. However, other markup languages or data representation techniques may be used.

TABLE I

| | Query Example |
|---|---|
| 001 | <?xml version="1.0"?> |
| 002 | <!--Query string representation: ("Hemoglobin_test > 20") |
| 003 | <QueryAbstraction> |
| 004 |   <Selection> |
| 005 |     <Condition> |
| 006 |       field="Hemoglobin Test" operator="GT" value="40" |
| 007 |     </Condition> |
| 008 |   </Selection> |
| 009 |   <Results> |
| 010 |     <Field name="Name"/> |
| 011 |     <Field name="Age"/> |
| 012 |     <Field name="hemoglobin_test"/> |
| 013 |   </Results> |
| 014 |   <Entity name="patient" > |
| 015 |     <FieldRef name="data://patient/PatientID" > |
| 016 |       <Usage type="query" /> |
| 017 |     </FieldRef> |
| 018 |   </Entity> |
| 019 | </QueryAbstraction> |

The XML markup shown in Table I includes the selection criteria 203 (lines 004-008) and the results criteria 204 (lines 009-013). Selection criteria 203 includes a field name (for a logical field), a comparison operator (=, >, <, etc) and a value expression (what the field is being compared to). In one embodiment, the results criteria 204 include a set of logical fields for which data should be returned. The actual data returned is for instances of the model entity with data consistent with the selection criteria 203. Line 17 identifies the model entity selected by a user, in this example, a "patient" model entity 201. Line 18 indicates the identifier in the physical database 214 used to identify instances of the model entity. In this case, instances of the "patient" model entity are identified using values from the "Patient ID" column of a patient table.

After composing an abstract query 202 a user may provide it to runtime component 114 for processing. The runtime component 114 may be configured to process the abstract query 202 by generating an intermediate representation, such as an abstract query plan. In one embodiment, an abstract query plan is composed from a combination of abstract elements from the data abstraction model and physical elements relating to the underlying physical database. For example, an abstract query plan may identify which relational tables and columns are referenced by which logical fields included in the abstract query, and further identify how to join columns of data together. The runtime component may then parse the intermediate representation in order to generate a physical query of the underlying physical database (e.g., an SQL statement (or statements) executed against database $214_2$)). Abstract query plans and query processing techniques are further described in a commonly assigned, co-pending application entitled "Abstract Query Plan," Ser. No. 11/005,418, filed Dec. 6, 2004, which is incorporated by reference herein in its entirety.

The Data Abstraction Model: Logical Fields

Figure 2B:
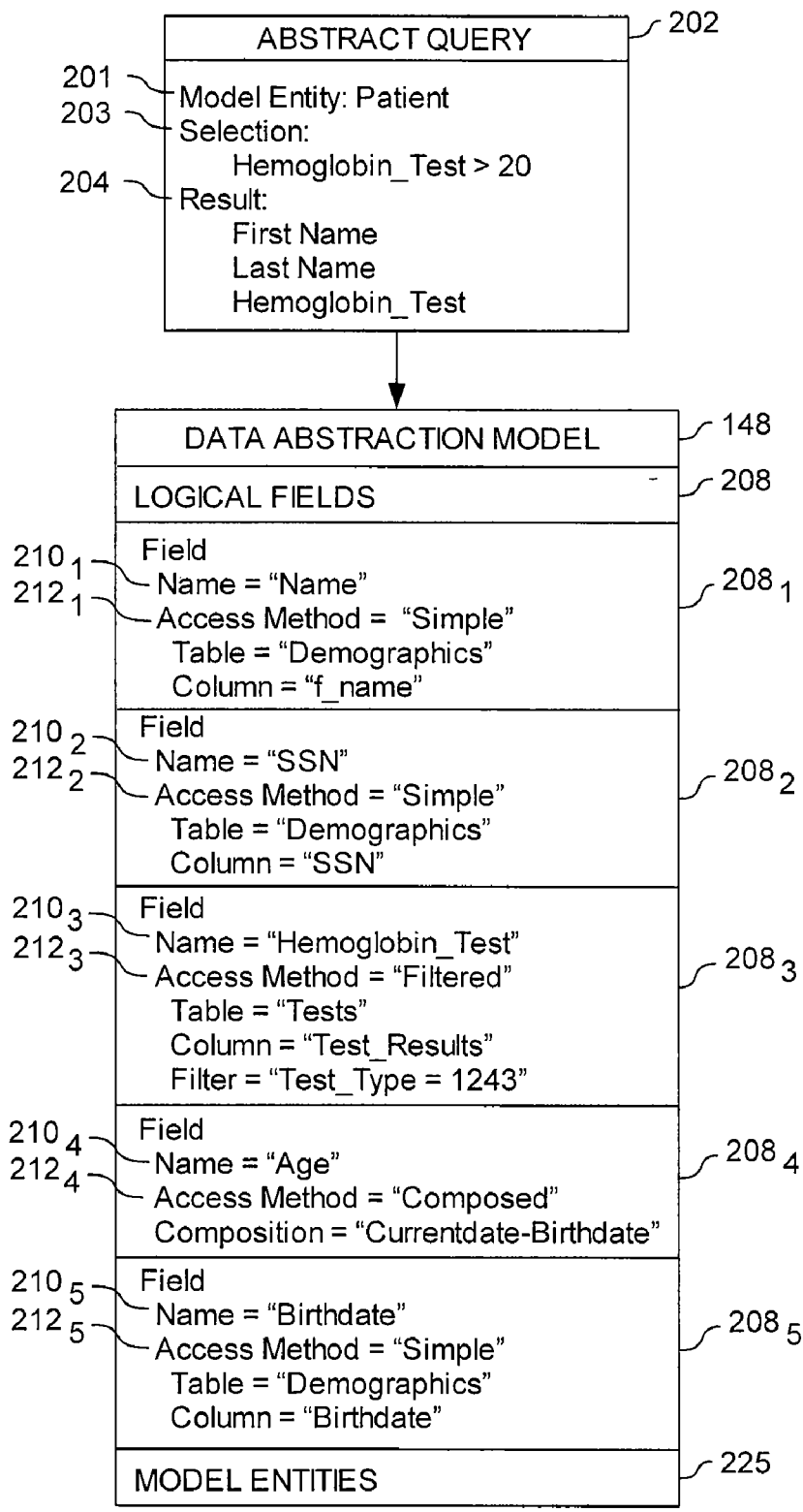
FIGS. 2B-2C further illustrates a data abstraction model, according to one embodiment of the invention.

FIG. 2B illustrates abstract query 202 along with an embodiment of a data abstraction model 148 using a plurality of logical field specifications $208_{1-6}$ (six shown by way of example). The access methods included in the logical field specifications 208 map these logical fields 208 to tables and columns in an underlying relational database (e.g., database $214_2$ shown in FIG. 2A). As illustrated, each field specification 208 identifies a logical field name $210_{1-6}$ and an associated access method $212_{1-6}$. Depending upon the different types of logical fields, any number of access method types may be supported by the data abstraction model 148. FIG. 2B illustrates access methods for simple fields, filtered fields, and composed fields. Each of these three access method types are described below.

A simple access method specifies a direct mapping to a particular entity in the underlying physical database. Field specifications $208_1$, $208_2$, $208_5$, and $208_6$ each provide a simple access method, $212_1$, $212_2$, $212_5$, and $212_6$ respectively. For a relational database, the simple access method maps a logical field to a specific database table and column. For example, the simple field access method $212_1$ shown in FIG. 2B maps the logical field name $210_1$ "Name" to a "name" column in a "Demographics" table. Similarly, $208_2$, $208_5$, and $208_6$ map to other tables and columns of an underlying physical database.

Logical field specification $208_3$ exemplifies a filtered field access method. Filtered access methods identify an associated physical database and provide rules that define a particular subset of items within the underlying database that should be returned for the filtered field or used for comparison purposes. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "hemoglobin test." The access method for this filtered field $212_3$ maps to the "Test_Result" column of a "Tests" tests table and defines a filter "Test_ID='1243.'" Only data from rows of a table that satisfies the filter are returned for this logical field, or used to evaluate a query condition. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be determined and provided to a user. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. In addition, more complex logical fields may be defined by combining the simple, filtered, and composed access method types. For example, a composed filed may include a filter.

By way of example, the specifications provided for the logical fields 208 illustrated in FIG. 2B are representative of logical fields mapped to data represented in the relational data representation $214_2$. However, other instances of the data repository abstraction component 148 or other logical field specifications may map to other physical data representations (e.g., databases $214_1$ or $214_3$ illustrated in FIG. 2A). Further, in one embodiment, the data abstraction model 148 is stored on computer system 110 using an XML document that describes the model entities, logical fields, access methods, and additional metadata that, collectively, define the data abstraction model 148 for a particular physical database system. Other storage mechanisms or markup languages, however, are also contemplated.

The Data Abstraction Model: Model Entities

Figure 2C:
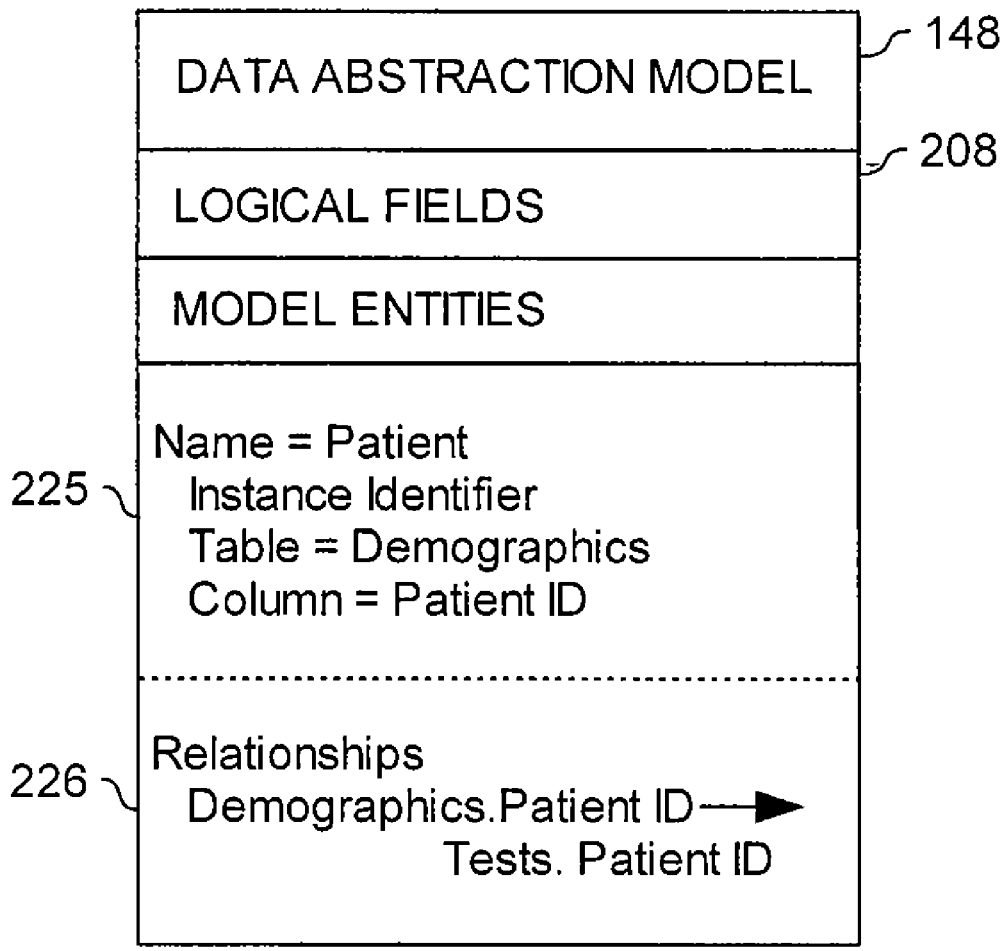

FIG. 2C further illustrates the exemplary data abstraction model 148. In addition to logical fields 208, the data abstraction model 148 may include model entity definitions 225. FIG. 2C illustrates a definition for the "patient" model entity first illustrated in FIGS. 2A and 2B. In one embodiment, the conditions included in an abstract query are evaluated against instances of the model entity in the underlying database. As illustrated, model entity definition 225 includes a model entity name, model entity relationships, paths to related model entities, and path categories.

Illustratively, the "patient" model entity 225 is defined with a name (for the model entity, e.g., "patient") and an instance identifier used to distinguish between instances of the patient model entity. In this example, instances of the "patient" model entity are identified using values from the "patient ID" column of a demographic table in the physical database 214.

The Data Abstraction Model: Physical Data Field Substitution

Figure 3:
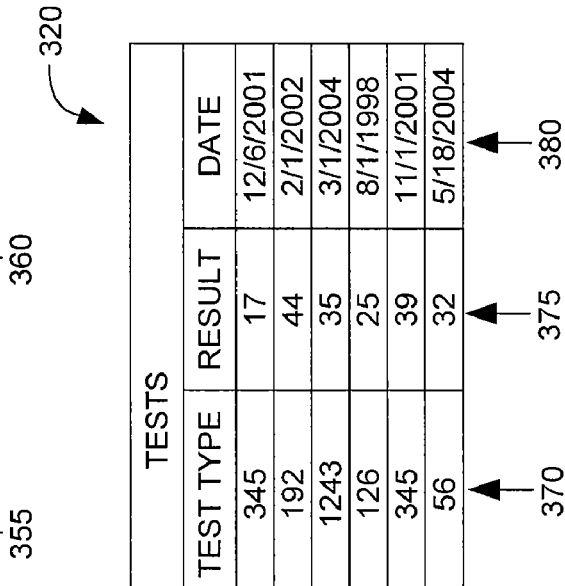
FIG. 3 illustrates an exemplary a set of relational database tables, used to illustrate different aspects of the invention, according to one embodiment of the invention.

FIG. 3 illustrates a set of relational database tables 300 corresponding to the data abstraction model 148 illustrated in FIGS. 2A-2C. Database tables 300 include the tables and columns referenced by the logical fields 208, and access methods 212. Accordingly, demographics table 310 includes a "Patient ID" column 345, a name column 355, and birthdate column 355. Additionally, table 310 includes SSN column 350 used to store patient social security numbers. The "Patient ID" column 345 is related to the "Patient ID" column 345 in database table 310 as indicated by lines segment 330 joining table 310 and table 320. Thus, data from these tables may be joined to form query results using values from the "Patient ID" column 345. The tests table 320 includes a "patient ID" column 365, test type column 370, test result column 375, and test date column 380.

Those skilled in the art will recognize that the example database 300 illustrated in FIG. 3 is simplified to illustrate embodiments of the present invention, and further, that a "production" database environment would likely include many more tables with additional columns, and more complex relationships between the tables.

Figure 4A:
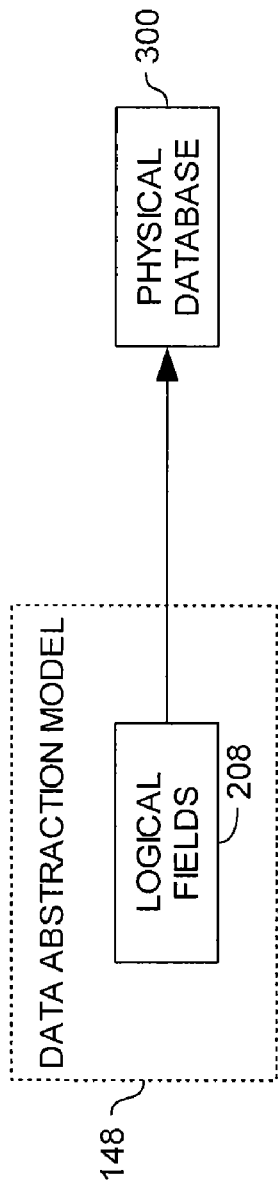
FIGS. 4A-4B are functional block diagrams illustrating the relationship between a data abstraction model, a set of physical data fields, and an underlying physical database.
Figure 4B:
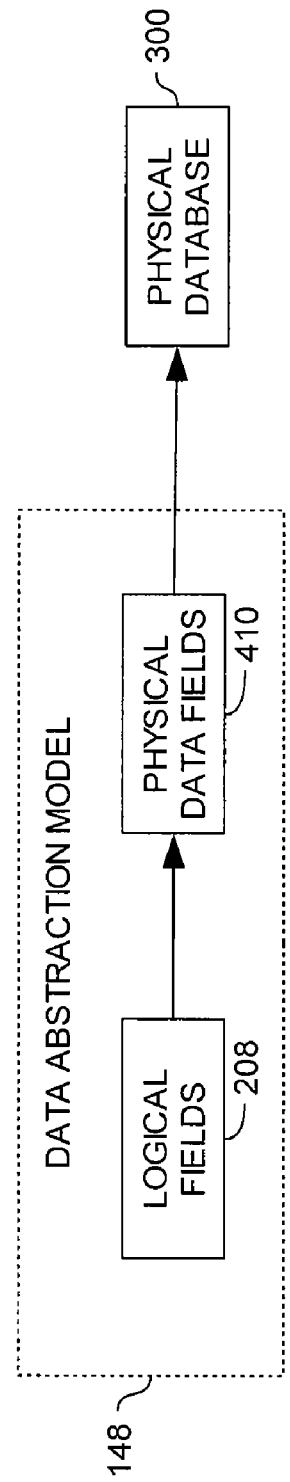

FIGS. 4A-4B are functional block diagrams illustrating the relationship between a data abstraction model 148, a set of physical data fields 410, and an underlying physical database 300, according to one embodiment of the invention. Specifically, FIG. 4A illustrates data abstraction model 148, which includes logical fields 208, mapping to physical database 300. Thus, these logical fields may include access methods that specify tables and columns from the physical database 300.

FIG. 4B also illustrates these components, but also includes physical data fields 410, disposed between the logical fields 208 and physical database 300. In one embodiment, physical data fields 410 provide a set of logical fields mapping to data locations in the database 300. For example, using the columns of database tables 310, a physical data field with a simple access method may be created for the patient ID column 345, SSN column 350, Name column 355, and the birthdate column 360. Similarly, physical data fields 410 may be created for each of the columns of database table 320.

Also, in FIG. 4B, the access methods of logical fields 208 map to the physical data fields 410, instead of physical database 300. The physical data fields 410 provide a layer of indirection between the logical fields 208 and the physical database. Rather than mapping directly into database 300 (as illustrated in FIG. 4A) the logical fields 208 in FIG. 4B map to the physical data fields 410, which, in turn, map into the physical database 300. Thus, any changes to a physical data field 410 will affect any logical field mapping to that particular physical data field. The physical data fields 410 provide a simple access control mechanism, as well as a layer to provide enhancements and additions to the data abstraction model 148 that are either difficult or impossible to implement without the additional layer provided by the physical data fields 410.

For example, a physical data field 410 that maps to the SSN column 350 may be configured to return only the last four digits of a patient's social security number (e.g., xxx-xx-1111 for the patient listed in row 302 of table 310). By defining the physical data field this way, any logical field 208 that maps to this physical data field 410 will retrieve only the partially redacted value. Thus, rather than having to analyze the access method of each logical field to determine whether it references the SSN column 350, the administrator only needs to define the single SSN physical data field to return data in an appropriately redacted form. Alternatively, access to data from this column may be controlled by removing this physical data field, or specifying that only certain users/groups may access the field, regardless of the logical field used to map to the corresponding physical data field.

As another example, not related to data security, the physical data field 410 may be configured to use non-security attributes of the underlying column to determine how the logical field (and all derived logical fields) is processed by the query interface 115 for data display or data manipulation. For example, a physical data field 410 may be configured to specify that the underlying column stores a particular data type such as currency value or a date value (e.g., test date column 380). For a currency data value, the physical data field may be configured to right-align data values, include the appropriate currency symbol, and ensure that only two significant digits are returned after a decimal point. For a date value, date formats (e.g., month/day/year or day/month/year) may be standardized. This behavior would then carry through to any logical field referencing the corresponding physical data field. As yet another example, the physical data field 410 may be associated with some executable function (e.g., a method call) to first process data being inserted into the database. Data integrity functions such as data validation, spell checking, and the like may then be added to any logical field that uses an access method to map to the physical data field.

In one embodiment, physical data fields 410 are generated when the data abstraction model 148 (along a query application 115 and any associated utility programs) is loaded into memory. The access methods defined by the logical fields of the data abstraction model are then remapped to equivalent physical data fields. When a logical field is encountered that includes a reference to a physical data location, e.g., a simple access method mapping to a table and column, a physical data field substitution is performed. First, if the physical data field does not exist for the logical field, it is created. This is a simple process of creating a new field with the same access method as the old field and inserting it into the data abstraction model 148. Second, the access method of the original field is replaced with access method mapping to the physical data fields.

In one embodiment, logical fields 208 may be grouped into categories. Each category may include an associated group of logical fields. For example, the remapped logical fields may each be associated with a category based on the physical location (e.g., a table) in the database. For example, if the physical location for a given access method maps to the test result column 374, the logical field into a category: "tests.table." Thereafter, should an administrator desire to remove (or block) access to a table based on a physical security model (e.g., based on data being stored in a particular table or column), this may be achieved by blocking access to the corresponding logical field category.

In one embodiment, the physical data field substitution process may occur automatically when a user first starts running the data abstraction model 148 and query interface 115. This allows logical fields to be with access methods that reference the underlying physical tables of the database 300 directly. Then, when such logical fields are put into use, the physical data field substitution process would remap the references to database 300 to an equivalent set of physical data fields. Alternatively, logical fields may be defined that reference the physical data fields directly.

Figure 5:
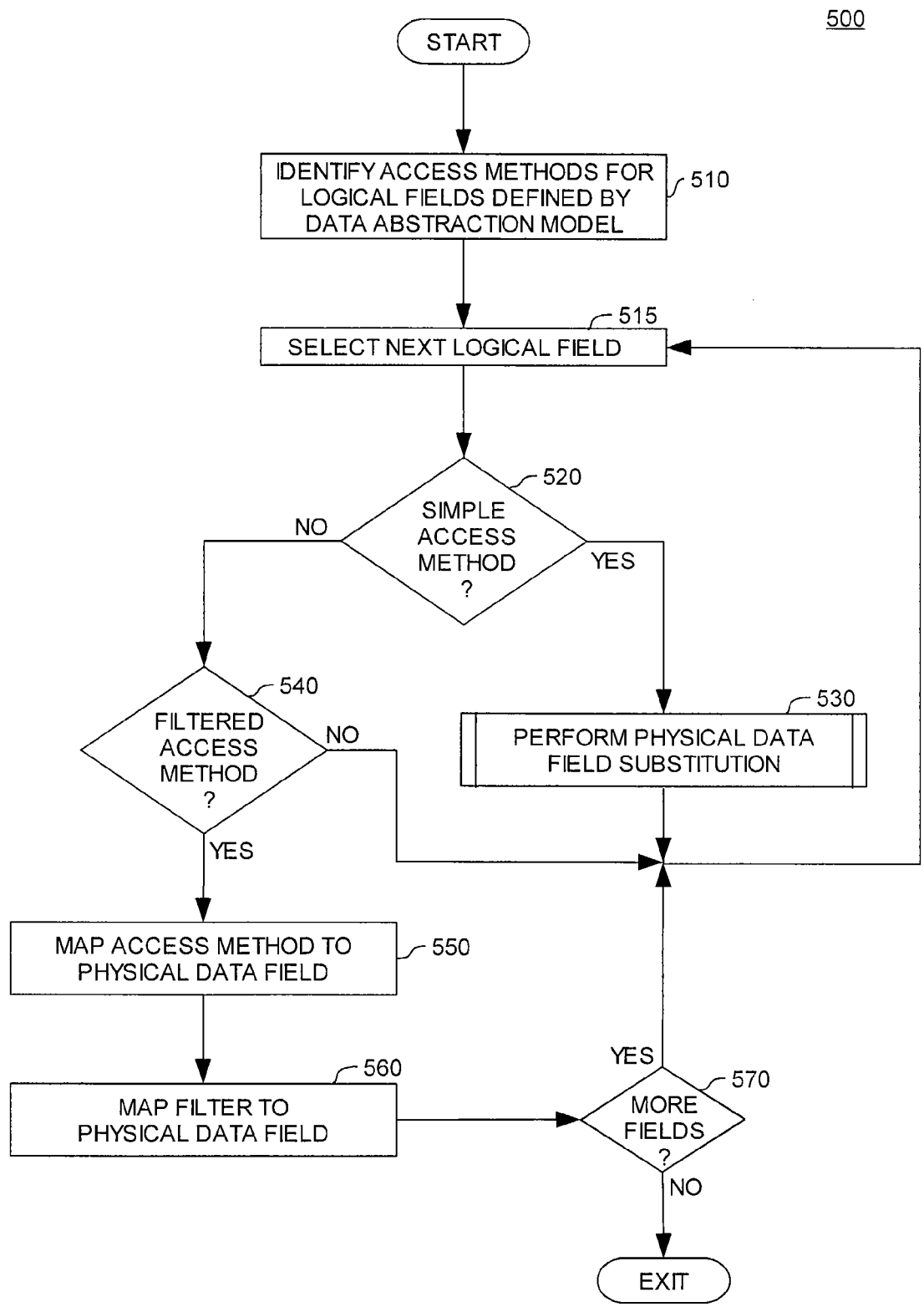
FIG. 5 illustrates a method for remapping the access methods of a data abstraction model to use physical data fields, according to one embodiment of the invention.

FIG. 5 illustrates a method for remapping the access methods 212 of a data abstraction model 148 to map to the physical data fields 410, according to one embodiment of the invention. At step 510, the method begins where the access methods specified by the logical fields 208 of a data abstraction model 148 are identified. Steps 515 through 570 include a loop to analyze the logical fields identified at step 510. The loop begins at step 515 where the next logical field is selected for analysis. At step 520, it is determined whether the logical field specifies a simple access method. If so, at step 530, a physical data field substitution is performed. Step 530 is described in greater detail below, in reference to FIG. 6. At step 540, the method determines whether the access method is a filtered access method. If not, the method returns to step 520, and evaluates the next logical field identified at step 510. If the logical field specifies a filtered access method, then at step 550, the table and column referenced by the access method are mapped to the equivalent physical data field. For example, the filtered access method of logical field 208₃ (illustrated in FIG. 2B) maps to the result column 375 of the tests table 320. Thus, at step 550, the access method is remapped to an equivalent physical data field; namely, to a physical data field with a simple access method mapping the physical data field to result column 375. At step 560, the filter defined for the access method is also mapped to the corresponding physical data field. For example, the access method of logical field 208₃ specifies a filter evaluated using data from the test type column 370 of database 300. After being remapped to the physical data field, the filter condition is evaluated using data from the equivalent physical data field created for the test type column 370 of table 320. At step 570, it is determined whether more logical fields remain for analysis. If so, the method 500 returns to step 515 and selects the next logical field. Otherwise, the method concludes.

Although the method 500 illustrated in FIG. 5 includes steps for remapping logical fields with simple and filtered access methods, data abstraction model environments that provide additional access method types may perform additional or alternative steps to those illustrated by the method 500 that remap any data references made to the physical database 300 to a respective physical data field 410. For example, any physical data locations or other logical fields referenced by the access method defined for a composed logical field may be redefined to map to an equivalent set of physical data fields. Once the method 500 is completed, however, the access method for each logical field maps to a corresponding physical data field, which in turn, maps to the respective field in the underlying physical database.

Figure 6:
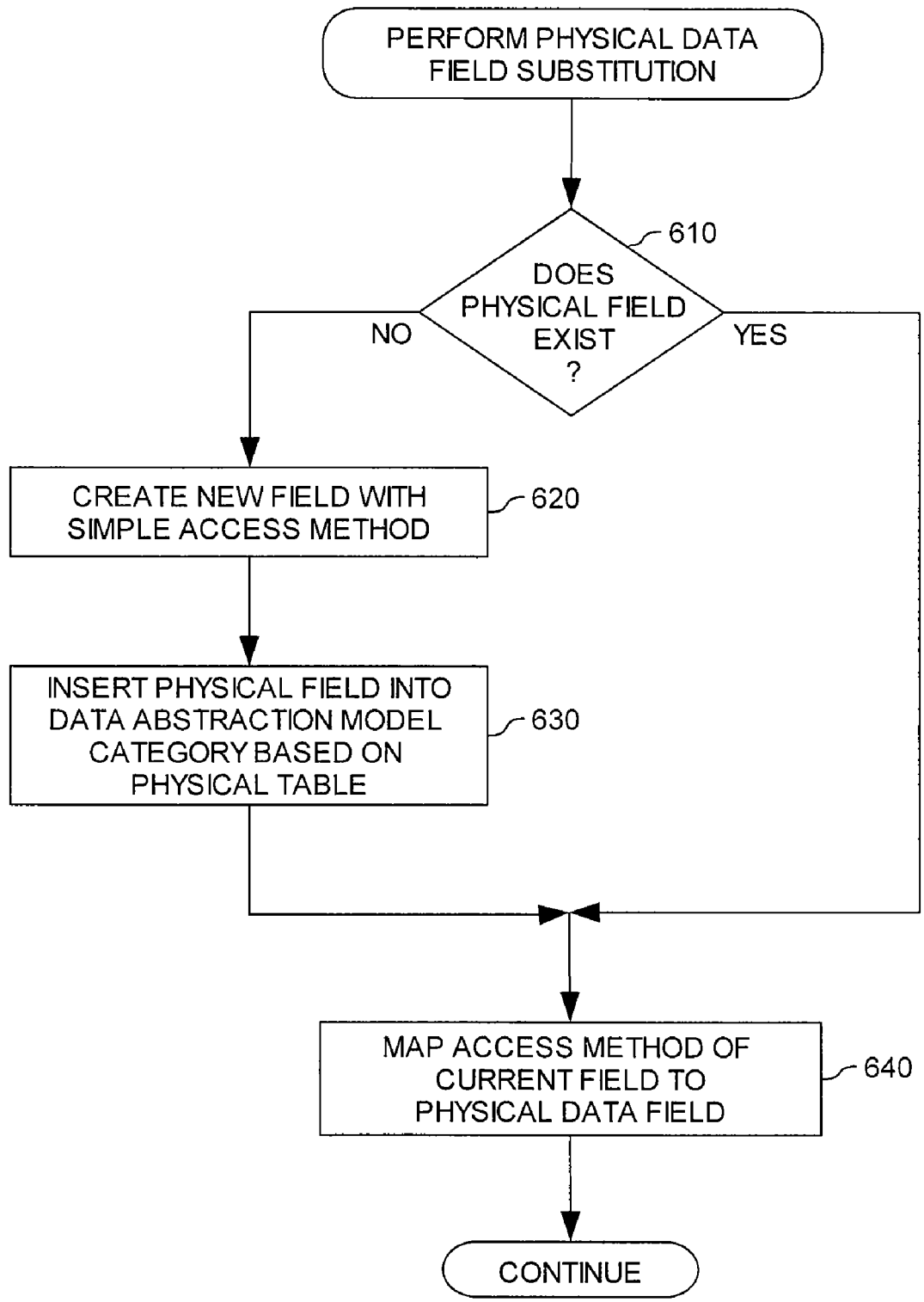
FIG. 6 illustrates a method for performing a physical data field substitution, according to one embodiment of the invention.

FIG. 6 illustrates a method for performing a physical data field substitution, according to one embodiment of the invention. In one embodiment, the method is performed as part of step 530 of the method 500 illustrated in FIG. 5. The method begins at step 610 where, for a logical field that specifies a simple access method (e.g., for a logical field selected at step 515 of method 500), it is determined whether a corresponding physical data field exists. If so, the access method for the logical field (e.g., the reference to a table and column of database 300) is remapped to reference the equivalent physical data field. Otherwise, the method proceeds to step 620 and creates a new physical data field with a simple access method. For example, using the birthdate logical field $208_5$, the newly created physical data field access method inherits the mapping used by the birthdate logical field $208_5$ (mapping to the birthdate column of the demographics table 310). At step 630, the physical data field may be associated with a logical field category, based on the physical table referenced by the simple access method. At step 640, the access method of the original logical field is modified to reference the newly created physical data field.

The methods illustrated in FIGS. 5 and 6 redefine the logical fields 208 of a data abstraction model 148. The physical data fields 410 create "sticky" attributes that are propagated by default throughout the rest of the data abstraction model 148. That is, any access method mapped to a physical data field 410 will inherit the security, presentation or display characteristics of the physical data field 410. This allows the administrator to protect the data itself and prevent accidentally setting the security attributes of a field that reference or uses this data to be something incompatible with the definition of the data.

Figure 7:
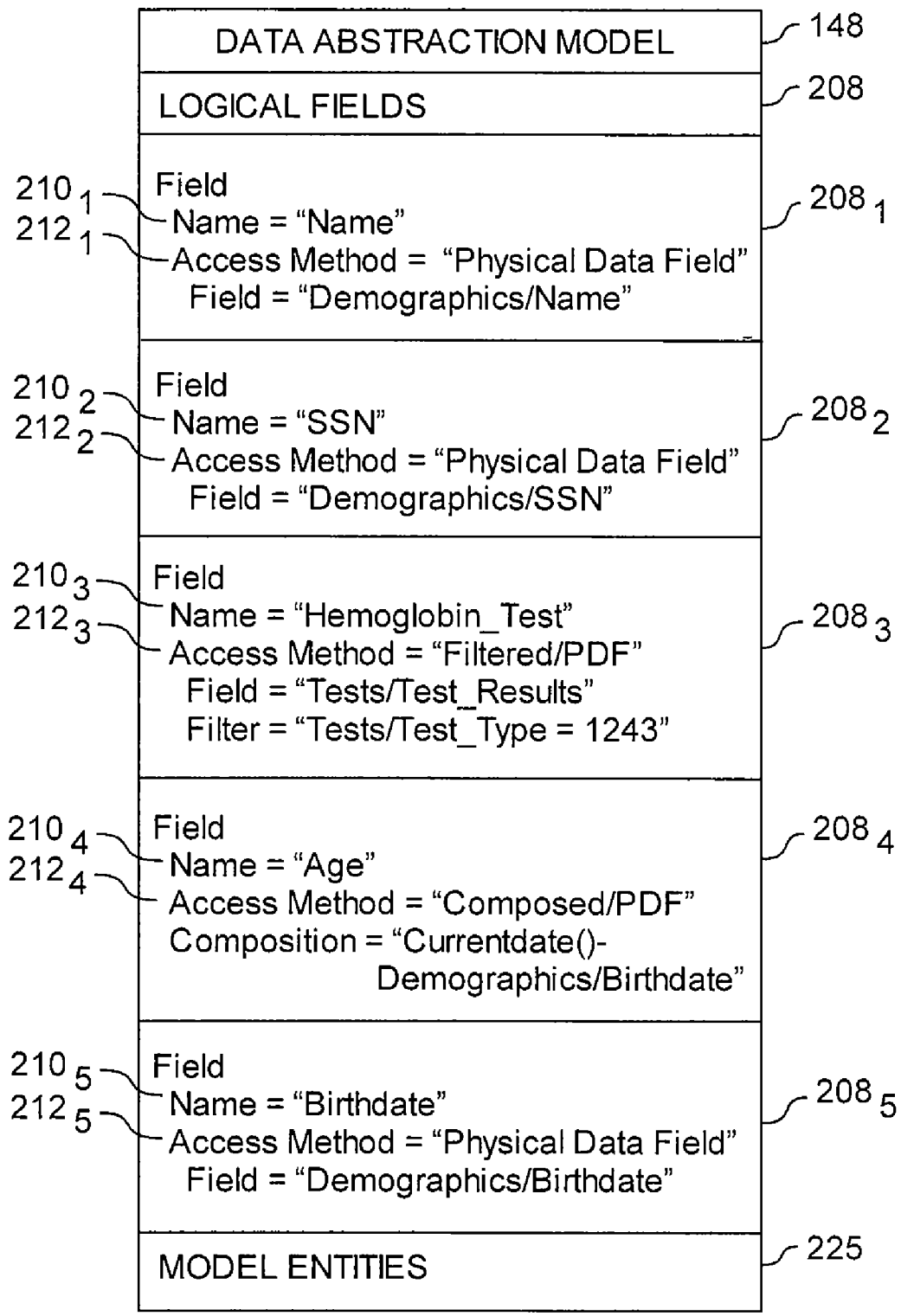
FIG. 7 illustrates the data abstraction model 148 after the processing the access methods using the methods illustrated in FIG. 5 and FIG. 6, according to one embodiment of the invention.

FIG. 7 illustrates the data abstraction model 148 first illustrated in FIG. 2B after applying the methods illustrated in FIG. 5 and FIG. 6, according to one embodiment of the invention. As illustrated, each of the access methods logical fields $208_{1-5}$ have been redefined to map to an equivalent physical data field 410. Thus, logical fields 208 with simple access methods ($212_1$, $212_2$, and $212_5$) are illustrated mapping to an equivalent physical data field. In addition, each redefined access method references both an equivalent logical field, along with a reference to a logical field category. In one embodiment, the category reference may be used by a database administrator to restrict access to a particular data abstraction model 148 using an abstraction model view 220. For example, by removing any logical fields in the "tests" category, the database administrator can limit access to data from the tests table 320. This may happen, for example, using a user/group security model that allows access to specific tables or columns based on individual user authorization. The categories and physical data fields are configured to implement directly the security model of the physical database 300.

Similarly, the access method of filtered field $208_3$ reference the equivalent physical data fields, and the composition expression of composed field $208_4$ references the "birthdate" physical data field, instead of referencing the underlying birthdate column 360 of table 310 directly.

CONCLUSION

As described above, creating an additional indirection layer between a data abstraction model and an underlying physical allows a variety of enhancements to be provided to the data abstraction model. This includes, for example, providing enhancements to the security, administration, and usability of an abstract database. In one embodiment, the indirection layer is created by mapping the access methods of the logical fields provided by a data abstraction model to a collection of physical data fields. In one embodiment, the physical data fields are themselves logical fields that have access methods mapping to the underlying physical data locations. For a relational database the underlying physical data locations includes physical tables and columns in the database.

For example, a simple security enhancement is provided by the redefinition of the social security column from database 300. The modified version of the SSN physical data field retrieves only the last four digits of a social security number, regardless of the logical field used to access this field, the physical data field prevents a user from accessing the first three digits of a social security number, or to even view and retrieve even this redacted value, without administrative authorization. This creates a significant measure of security for a database administrator knowing that no field may use or access data from the SSN column in any way that would not be allowed by the definition of the physical data field.

While the foregoing is directed to embodiments of the present invention, other and further embodiments of the invention may be devised without departing from the basic scope thereof, and the scope thereof is determined by the claims that follow.

What is claimed is:

1. A computer-readable storage medium containing a program, which when executed on a computer system performs an operation for providing access to physical data in a physical database, comprising:

(i) providing a physical data field layer that provides a plurality of physical data fields, wherein each physical data field specifies a mapping from the physical data field to a data location in the physical database;

(ii) providing a logical field layer that includes a plurality of logical field definitions, each of the definitions comprising a logical field name and a reference to an access method that defines a manner of exposing specified data specified data for the logical field definition, wherein each physical data field, of the plurality of physical data fields, is initially generated based on one of the logical field definitions included in the logical field layer by:

identifying the access method defined for a particular logical field definition, generating a corresponding physical data field that maps to a data location of the specified data, and redefining the access method for the particular logical field definition to expose data retrieved from the corresponding physical data field; and (iii) providing an interface to the plurality of logical field definitions, wherein the interface presents a user with an interface for composing an abstract query from the logical field definitions.

2. The computer-readable storage medium of claim 1, further comprising:
  receiving, an abstract query composed according to the query specification, and in response:
    transforming the abstract query into a physical query consistent with the underlying physical database; and
    executing the physical query to retrieve a query result set from the physical database.

3. The computer-readable storage medium of claim 1, further comprising:
  grouping the plurality of physical data into categories, wherein each physical data field maps to a column of the underlying database, and wherein physical data fields that map to columns from the same table are grouped into the same category.

4. The computer-readable storage medium of claim 1, further comprising:
  restricting what data is retrievable from the physical data source using a corresponding physical data field, based on a security model defined for the physical database.

5. The computer-readable storage medium of claim 1, wherein the access method defined for each of the plurality of logical fields is selected from at least two different access method types, and wherein each different access method type defines a different manner of exposing the physical data corresponding to a logical field.

6. The computer-readable storage medium of claim 1, further comprising:
  formatting data accessed by a physical data field according to a display property specified by the physical data field.

7. The computer-readable storage medium of claim 6, wherein the formatting comprises redacting at least a portion of the data associated with a physical data field referenced by the access method of a logical field included in an abstract query.

8. The computer-readable storage medium of claim 1, wherein generating, for each logical field, a physical data field occurs dynamically, each time a user first accesses a data abstraction model.

9. The computer-readable storage medium of claim 1, wherein the physical data field layer provides a common namespace for the plurality of logical fields and data locations in the physical database, and wherein the plurality of logical fields provide access to the physical data based on what is exposed from the physical database by the by the physical data field layer.

10. A system for providing access to a physical database, comprising:
  one or more computer readable storage media;
  a logical field layer, stored on at least one of the one or more computer readable storage media, and comprising a plurality of logical field definitions, wherein each of the definitions includes a logical field name and at least one an access method selected from at least two different access method types, and wherein each different access methods type defines a different manner of exposing specified data retrieved from a physical data field;
  a physical data field layer, stored on at least one of the one or more computer readable storage media, and logically disposed between the logical field layer and the physical database comprising a plurality of physical data fields, wherein each physical data field specifies a mapping from the physical data field to a data location in the physical database, wherein each physical data field, of the plurality of physical data fields, is initially generated based on one of the logical field definitions included in the logical field layer by:
    identifying the access method defined for a particular logical field definition,
    generating a corresponding physical data field that maps to a data location of the specified data, and
    redefining the access method for the particular logical field definition to expose data retrieved from the corresponding physical data field; and
  a query specification that defines an interface to the plurality of logical field definitions, wherein the interface presents a user with an interface for composing an abstract query from the logical field definitions.

* * * * *